(12) United States Patent
Okada et al.

(10) Patent No.: US 7,298,972 B2
(45) Date of Patent: Nov. 20, 2007

(54) OPTICAL SWITCH AND A CONTROL METHOD THEREOF

(75) Inventors: Ryoji Okada, Chiyoda (JP); Tadaaki Ishikawa, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 442 days.

(21) Appl. No.: 10/670,355

(22) Filed: Sep. 26, 2003

(65) Prior Publication Data

US 2005/0117838 A1  Jun. 2, 2005

(30) Foreign Application Priority Data

Oct. 1, 2002  (JP) .............................. 2002-288192

(51) Int. Cl.
*H04B 10/08*  (2006.01)
*H04J 14/00*  (2006.01)

(52) U.S. Cl. ............................. 398/33; 398/45; 398/48; 398/55

(58) Field of Classification Search .................. 398/12, 398/19, 33, 45, 48–50, 55–57
See application file for complete search history.

(56) References Cited

U.S. PATENT DOCUMENTS

| | | | |
|---|---|---|---|
| 6,519,383 B1 * | 2/2003 | Cannell | 385/18 |
| 6,549,691 B1 | 4/2003 | Street et al. | 385/18 |
| 6,556,285 B1 * | 4/2003 | Dickson | 356/121 |
| 6,610,974 B1 * | 8/2003 | Hunt et al. | 250/227.22 |
| 6,711,314 B1 * | 3/2004 | Mori et al. | 385/17 |
| 6,798,992 B1 | 9/2004 | Bishop et al. | 398/45 |
| 2002/0057862 A1 | 5/2002 | Okayama | |
| 2002/0071627 A1 * | 6/2002 | Smith et al. | 385/15 |
| 2002/0109076 A1 | 8/2002 | Tochio et al. | |

FOREIGN PATENT DOCUMENTS

| | | |
|---|---|---|
| JP | A-2001-174723 | 6/2001 |
| JP | A-2002-162575 | 6/2002 |
| JP | A-2002-214546 | 7/2002 |
| JP | A-2002-236264 | 8/2002 |
| WO | WO99/67666 | 12/1999 |
| WO | 2001/095013 | 12/2001 |

* cited by examiner

*Primary Examiner*—Dalzid Singh
(74) *Attorney, Agent, or Firm*—Antonelli, Terry, Stout & Kraus, LLP.

(57) ABSTRACT

An optical switch for switching communication light beams propagating through a plurality of optical fibers. The switch includes a plurality of input-side lenses, a plurality of moving mirrors, a plurality of output-side lenses, light emitting units, and light receiving units arranged for optical communication. The plurality of input-side lenses include first input-side lenses to which communication light beams coming from first external units and propagating through input-side optical fibers connect optically and second input-side lenses to which the light beams from the light emitting units connect optically. The plurality of output-side lenses include first output-side lenses for causing light beams passing therethrough to optically connect to second output-side optical fibers adapted to propagate the communication light beams to second external units and second output-side lenses for causing the light beams coming from the light emitting units and passing therethrough to optically connect to the light receiving units.

9 Claims, 7 Drawing Sheets

OPTICAL SWITCH AND A CONTROL METHOD THEREOF

BACKGROUND OF THE INVENTION

The present invention relates to an optical communication system using optical fibers and more particularly to an optical switch using a technique of microelectro mechanical systems (MEMS).

In an optical communication system, N×N optical switches are required at a relay point of communication network, which switches can connect arbitrary one of communication light beams transmitted to N input ports through optical fibers to arbitrary one of N output ports and can switch these connections freely. In the past, to meet this requirement, light beams have once been converted into electrical signals and after being subjected to switching, the electrical signals have been converted into light beams. In recent years, an optical switch has been developed which can perform switching of light beams while keeping them intact.

Available as a technique of optically monitoring optical connections in an optical switch is JP-A-2001-117025 based on U.S. application Ser. No. 09/414,621 filed on Oct. 8, 1999. The JP-A-2001-117025 discloses a configuration using optical translation units disposed before and after the optical switch. The optical translation unit is an appliance adapted to once convert a communication light beam into an electrical signal, confirm its intensity and waveform and thereafter reconvert the electrical signal into a communication light beam to transmit it to the optical switch, thus assuring the quality of the communication light beam. In the JP-A, electrical signals inside the optical translation units disposed before and after the optical switch are compared to each other and the attitude of moving mirrors is so controlled as to minimize the difference.

Highly accurate positioning is required of light beams incident upon output-side collimator lenses. In the event that a light beam deviates from the end face of an output-side collimator lens, optical coupling fails. Even when entering the end face of the output-side collimator lens, the light beam will fail to couple optically or a large loss will be incurred if its incident angle is outside a proper range. In the initial stage of assembling, collimator lens arrays and mirror arrays are positioned highly accurately.

However, as the temperature in the optical switch installation environment changes, the relative position between a collimator lens array and a mirror lens array changes and the optical coupling possibly fails even if predetermined attitudes of the moving mirrors are maintained. Otherwise, a large loss will possibly be incurred. Or, when the temperature in the optical switch system per se rises owing to continuous switching, the output of an electrical circuit changes and the moving mirrors will possibly fail to keep their predetermined attitudes.

In the method disclosed in the JP-A-2001-117025, the optical translation units before and after the optical switch are indispensable and disadvantageously, they make the construction complicated. Therefore, no reduction in the cost of the optical switch comes out. In addition, since two optical translation units are installed in respect of individual N ports, totaling 2N, and as a result, the size of equipment increases.

BRIEF SUMMARY OF THE INVENTION

Accordingly, an object of the present invention is to provide a compact optical switch which can solve the aforementioned problems encountered in the conventional example and can permit moving mirrors to keep optimum attitudes in correspondence with a change in temperatures in the installation environment of the optical switch.

Another object of the invention is to provide an optical switch control method which does not branch and measure input and output light beams associated with all optical fibers preceding and succeeding the optical switch and which can permit the moving mirrors to keep the optimum attitudes in correspondence with changes in temperatures in the installation environment of the optical switch.

To accomplish the above objects, solving means in the present invention can be carried out in modes exemplified as below.

According to a first aspect of the invention, there is provided an optical switch adapted to switch communication light beams propagating through a plurality of optical fibers and comprising a plurality of input-side lenses to which input light beams connect optically, a plurality of moving mirrors to which the light beams passing through the input-side lenses connect optically, a plurality of output-side lenses to which the light beams going by way of the moving mirrors connect optically, light emitting units for generating light beams optically connecting to the moving mirrors and light receiving units to which the light beams coming from the light emitting units and going by way of the moving mirrors connect optically, wherein the plurality of input-side lenses include first input-side lenses to which communication light beams coming from first external units and passing through the input-side optical fibers connect optically and second input-side lenses to which the light beams from the light emitting units connect optically, and wherein the plurality of output-side lenses include first output-side lenses for causing light beams passing therethrough to optically connect to second output-side optical fibers adapted to propagate the communication light beams to second external units and second output-side lenses for causing light beams coming from the light emitting units and passing therethrough to optically connect to the light receiving units.

According to a second aspect of the invention, there is provided, in the first aspect, an optical switch comprising a mirror control unit for correcting, on the basis of signals from the light receiving units to which the light beams passing through the second input-side lenses or the second output-side lenses connect optically, control values adapted to control angles necessary to move the moving mirrors to which the light beams passing through the first input-side lenses connect optically.

According to a third aspect of the invention, there is provided an optical switch adapted to switch communication light beams propagating through a plurality of optical fibers and comprising a plurality of input-side lenses to which input light beams connect optically, a plurality of moving mirrors to which the light beams passing through the input-side lenses connect optically, a plurality of output-side lenses to which the light beams going by way of the moving mirrors connect optically, light emitting units for generating light beams optically connecting to the moving mirrors, and light receiving units to which the light beams coming from the light emitting units and going by way of the moving mirrors connect optically, wherein the plurality of moving mirrors include a plurality of first moving mirrors to which communication light beams coming from first external units and propagating through the input-side optical fibers connect optically, and a plurality of second moving mirrors to which the light beams from the light emitting units connect optically.

According to a fourth aspect of the invention, there is provided, in the third aspect, an optical switch comprising a mirror control unit for correcting, on the basis of signals from the light receiving units to which the light beams going by way of the second moving mirrors connect optically, control values adapted to control angles necessary to move the plurality of first moving mirrors.

According to a fifth aspect of the invention, there is provided an optical switch optically positioned between N input-side optical fibers and N output-side optical fibers to switch communication light beams propagating through the optical fibers and comprising an input-side lens array having a plurality of lenses optically coupled to the input-side optical fibers, an output-side lens array having a plurality of lenses optically coupled to the input-side optical fibers, a primary mirror array having a plurality of swingably supported mirrors adapted to reflect communication light beams from the input-side lenses, and a secondary mirror array having a plurality of swingably supported mirrors adapted to reflect the communication light beams reflected from the primary mirror array, wherein the number of the input-side lenses is N+2 or more, the number of the output-side lenses is N+2 or more, the number of mirrors of the primary mirror array is N+2 or more and the number of mirrors of the secondary mirror array is N+2 or more.

According to a sixth aspect of the invention, there is provided, in the fifth aspect, an optical switch comprising light receiving elements and a mirror control unit for controlling positions of the mirrors on the basis of signals from the light receiving elements, wherein each of the input-side lens array and the output-side lens array has a plurality of lenses optically coupled to the light receiving elements and each of the primary mirror array and the secondary mirror array has a plurality of mirrors optically coupled to the light receiving elements.

The light emitting elements not generating communication light beams propagating through the optical fibers are optically coupled to the light receiving elements capable of receiving light beams generated by the light emitting elements and the coupling is switched by using the optical switch, and the mirror control unit can use signals for controlling mirrors intervening the coupling to control the mirrors adapted to switch the communication light beams propagating through the input-side optical fibers and output-side optical fibers.

Similarly, the number of mirrors of the primary mirror array adapted to reflect the communication light beams from the input-side lenses is set to at least N+2 or more and the number of mirrors of the secondary mirror array adapted to reflect the communication light beams reflected from the primary mirror array is set to at least N+2 or more.

Other objects, features and advantages of the invention will become apparent from the following description of the embodiments of the invention taken in conjunction with the accompanying drawings.

DETAILED DESCRIPTION OF THE INVENTION

Embodiments of the invention will be described hereunder in greater detail by making reference to the drawings. The present invention is in no way limited to configurations described in the specification and is not prevented from being applied with present-day known techniques or newly developable known techniques.

Figure 1:
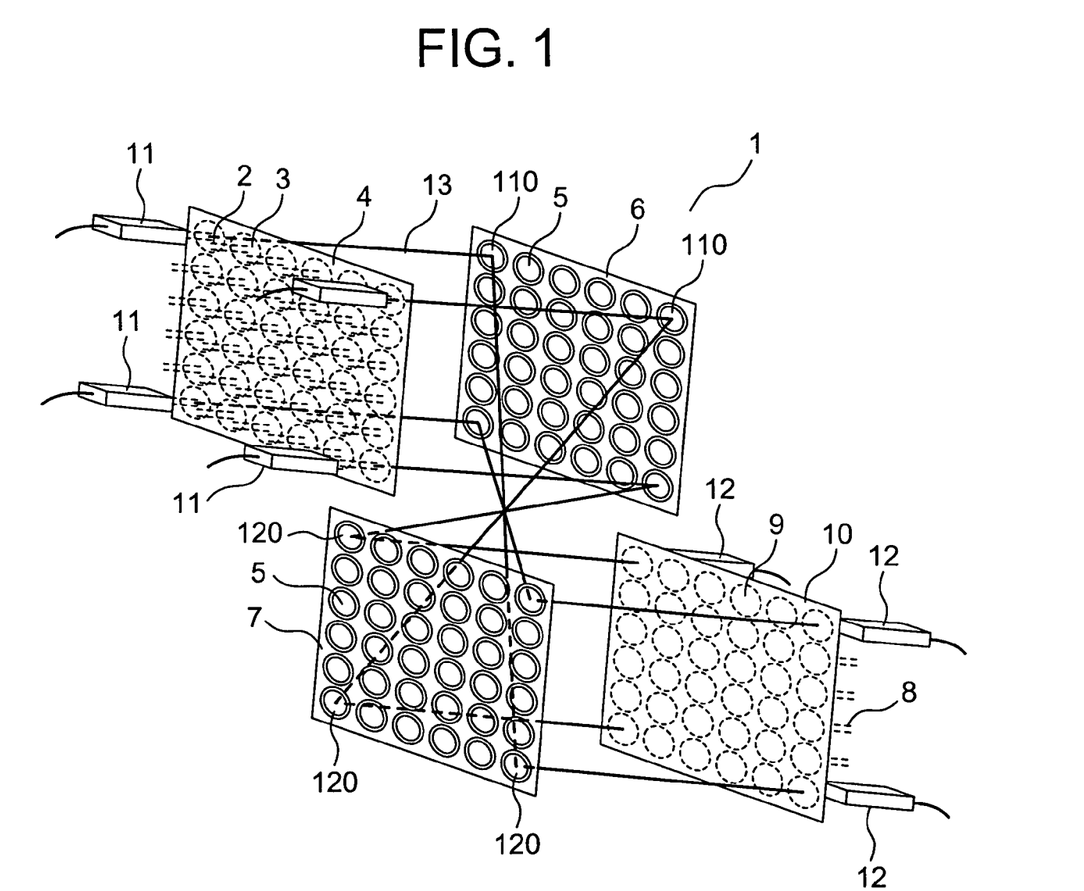
FIG. 1 is a schematic perspective view of an optical switch according to a first embodiment of the invention.

FIG. 1 is a schematic perspective view of an optical switch according to a first embodiment of the invention. The optical switch 1 comprises, as constituent components, an input-side collimator lens array 4 having arrayed input-side collimator lenses 3 optically coupled to a plurality of input-side optical fibers 2, primary and secondary mirror arrays 6 and 7 each having two-axially swingably movable, arrayed moving mirrors 5 and an output-side collimator lens array 10 having arrayed output-side collimator lenses 9 optically coupled to output-side optical fibers 8. The moving mirrors 5 of each of the primary mirror array 6 and the secondary mirror array 7 are inclined suitably to optically couple the input-side optical fibers 2 to the output-side optical fibers 8 arbitrarily. The present embodiment will be described by way of example of an electrostatic drive system.

In the present embodiment, both the input-side optical fibers 2 and the output-side optical fibers 8 are 32 in number, thus indicating an optical of 32×32 channels. But, the number of collimator lenses in each of the input-side collimator lenses 3 and the output-side collimator lenses 9 is 36 and similarly, the number of moving mirrors 5 in each of the primary mirror array 6 and the secondary mirror array 7 is 36. The plurality of input-side collimator lenses 3 include a plurality of first input-side lenses to which communication light beams coming from first external units and propagating through the input-side optical fibers 2 connect optically and a plurality of second input-side lenses to which light beams from laser diodes 11 representing light emitting units connect optically. Then, the plurality of output-side collimator lenses 9 have a configuration including a plurality of first output-side lenses to which light beams passing therethrough optically connect to first output-side optical fibers 8 adapted to propagate the communication light beams to second external units and a plurality of second output-side lenses for optically connecting the light beams coming from the light emitting units and passing therethrough to light receiving units.

The optical switch includes, as the light emitting units, laser diodes serving as light emitting elements. Also included as the light receiving units are photodiodes serving as light receiving elements. In a specified example, four laser diodes 11 (hereinafter indicated as LD's) are coupled to the input-side collimator lenses 3 at four corners and similarly, photodiodes 12 (hereinafter indicated as PD's) are coupled to four corners of the output-side collimator lens array 10. In the illustrated example, the plurality of first input-side lenses and the plurality of first output-side lenses are each 32 in number and the plurality of second input-side lenses and the plurality of second output-side lenses are each 4 in number.

Hereinafter, the laser beam from the LD 11 will be termed a measuring light beam 13 in order that it can be discriminated from the communication light beam. Further, the moving mirrors at four corners of primary mirror array 6 which are used for reflecting the measuring light beams 13 will be termed primary measuring mirrors 110 and the moving mirrors at four corners of secondary mirror array 7 will be termed secondary measuring mirrors 120.

Then, there is provided a mirror control unit 14 (FIG. 4) for correcting, on the basis of signals from the photodiodes 12 representing the light receiving units to which the light beams passing through the plurality of second input-side lenses and the plurality of first output-side lenses connect optically, control values adapted to control angles necessary to move the moving mirrors to which the light beams passing through the plurality of first input lenses connect optically.

Figure 4:
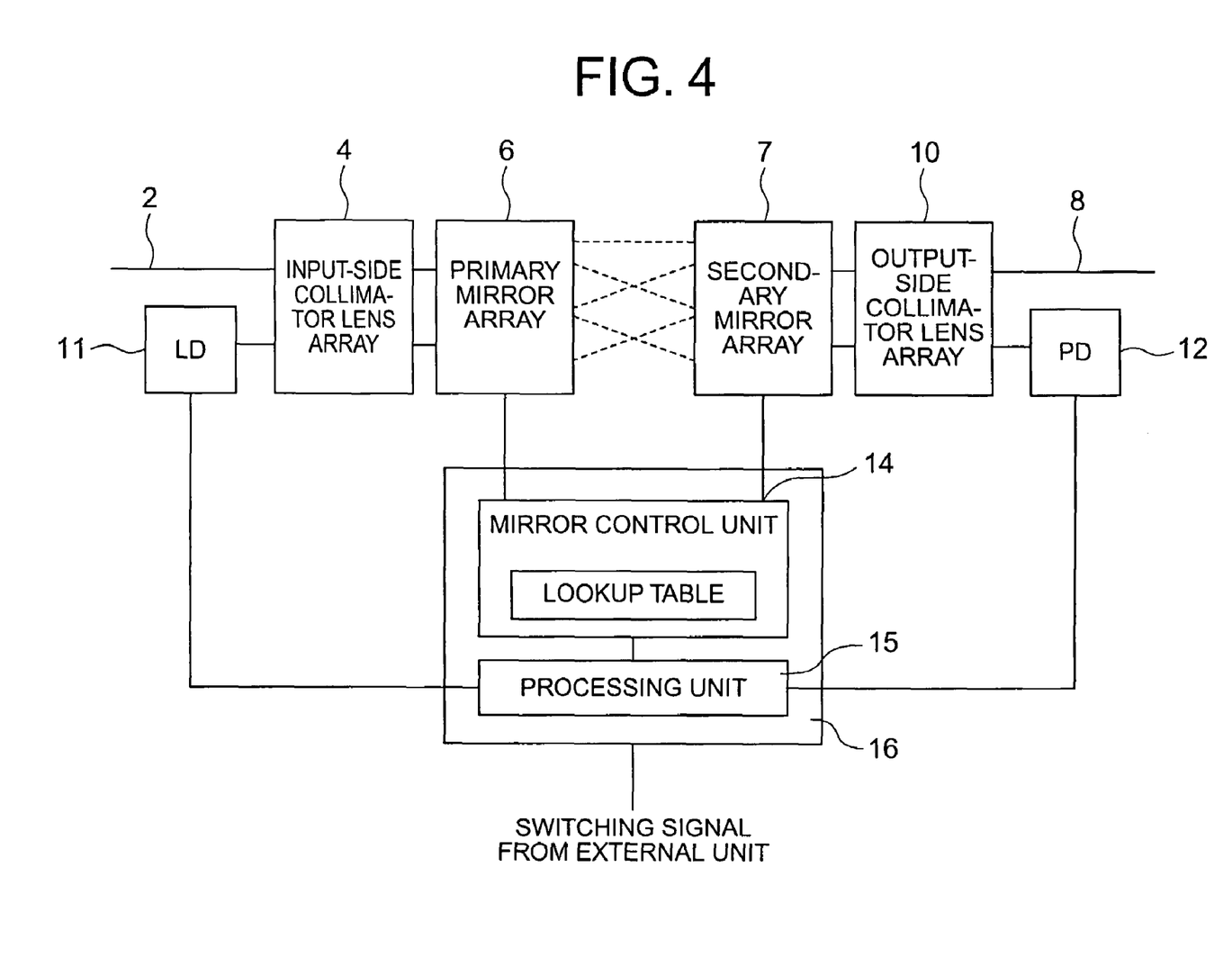
FIG. 4 is a block diagram showing the construction of a control system according to an embodiment of the invention.

Further, in the above configuration, there are provided the laser diodes 11 representing light emitting units for generating light beams connecting optically to the moving mirrors and the photodiodes 12 representing light receiving units to which the light beams coming from the light emitting units and going by way of the moving mirrors connect optically. The plurality of moving mirrors can be formed as having a plurality of first moving mirrors to which the communication light beams coming from the first external units and propagating through the input-side optical fibers connect optically and a plurality of second moving mirrors to which the light beams from the light emitting units connect optically. Then, the configuration can be defined as having the mirror control unit 14 for correcting control values adapted to control angles necessary to move the plurality of first moving mirrors on the basis of signals from the light receiving units to which the light beams going by way of the second moving mirrors connect optically.

As described above, the plurality of lenses and the plurality of swingably supported mirrors are provided, part of the plurality of lenses optically couple to the optical fibers, part of the plurality of lenses optically couple to the light emitting elements not generating the communication light beams propagating through the optical fibers, and part of the plurality of lenses optically couple to the light receiving elements capable of receiving light beams generated by the light emitting elements.

Firstly, a method of controlling the moving mirrors 5 of the primary mirror array 6 and secondary mirror array 7 will be described.

An instance will first be described in which with the optical switch assembled, a slight positional difference takes place between the collimator lens array and the mirror array. In addition, it is not always held that all of the individual moving mirrors have uniform rigidity as defined by the size of beams supporting a mirror portion and the distance between the mirror portion and a corresponding drive electrode. Accordingly, even when a voltage is applied to incline the moving mirror by using a mirror angle geometrically calculated from an ideally arranged state and beam rigidity and electrostatic attractive force calculated from the design size, the mirror portion will not be inclined by an intended angle and the input-side optical fiber will not couple optically to the output-side optical fiber at the maximum efficiency. Further, because of a change in the temperature in the system, a slight positional difference between the collimator lens array and the mirror array takes place and the above phenomenon is aggravated.

Accordingly, optimum inclination angles, that is, optimum application voltages in individual combinations of moving mirrors of the primary mirror array and secondary mirror array must be mapped after the optical switch has been assembled, in order that the input-side optical fibers and the output-side optical fibers can be coupled optically to each other at the maximum efficiency. Hereinafter, this map preparation work will be indicated as initial adjustment work.

Figure 2:
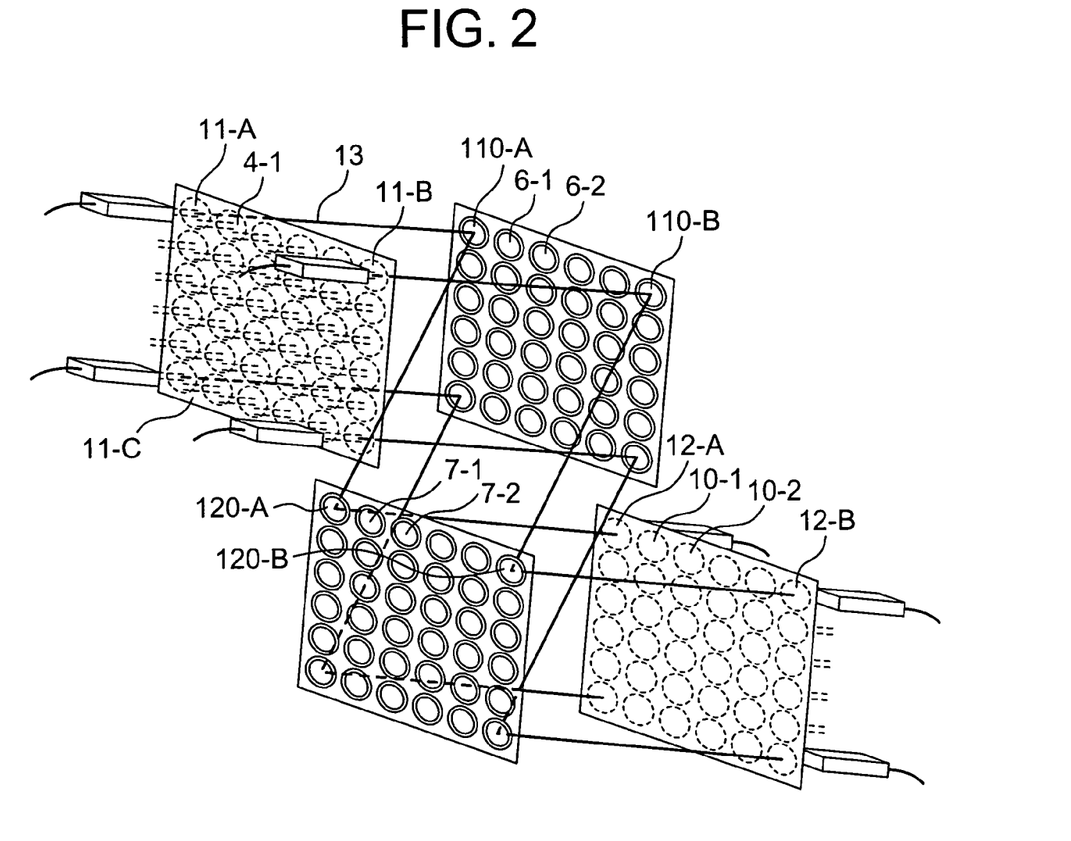
FIG. 2 is a schematic perspective view of the optical switch according to the first embodiment of the invention.

By making reference to FIGS. 2 and 3, the initial adjustment work will be described. FIG. 2 is a schematic perspective view of the optical switch according to the first embodiment of the invention. For description to be given hereinafter, individual lenses of the input-side collimator lens array 4 and output-side collimator lens array 10 and individual moving mirrors of the primary mirror array 6 and secondary mirror array 7 will be designated by suffixed reference numerals.

In the input-side collimator lens array 4, lenses at four corners coupled to the LD's 11 are designated by 11-A to 11-D (for avoidance of complexity, the reference numeral denotation is partly omitted). Further, lenses for delivery of communication light beams are designated by 4-1 to 4-32 (for avoidance of complexity, the reference numeral denotation is partly omitted). In the primary mirror array 6, to apply similar reference numerals to positions opposite to corresponding lenses, primary measuring mirrors 110 are designated by 110-A to 110-D and moving mirrors are designated by 6-1 to 6-32 (for avoidance of complexity, the reference numeral denotation is partly omitted). In the output-side collimator lens array 10, lenses at four corners coupled to the PD's 12 are designated by 12-A to 12D and lenses for receiving the communication light beams are designated by 10-1 to 10-32 (for avoidance of complexity, the reference numeral denotation is partly omitted). In the secondary mirror array 7, to apply similar reference numerals to positions opposite to corresponding lenses, secondary measuring mirrors 120 are designated by 120-A to 120-D and moving mirrors are designated by 7-1 to 7-32 (for avoidance of complexity, the reference numeral denotation is partly omitted).

Figure 3:
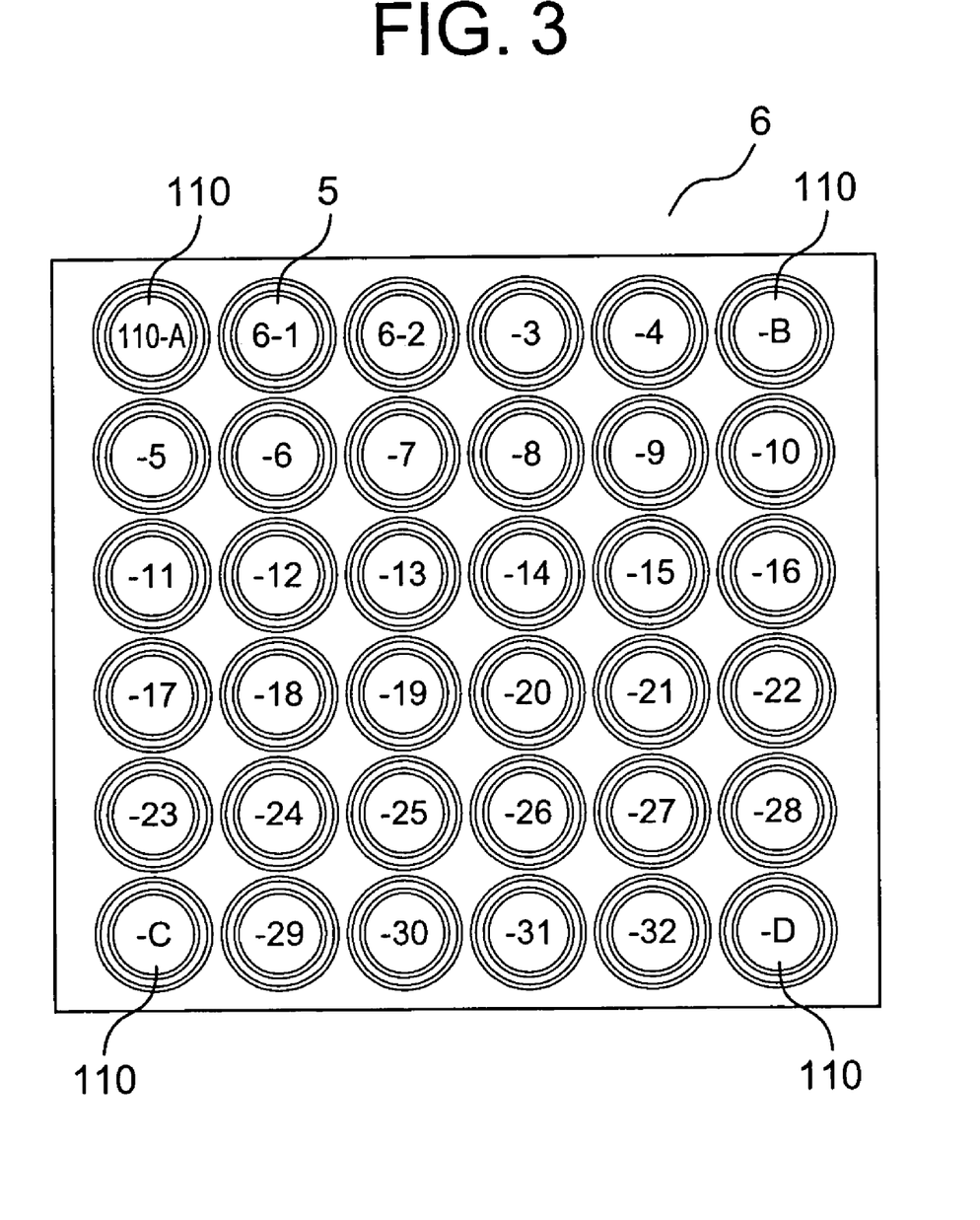
FIG. 3 is a front view of a primary mirror array 6.

For clarity of the arrangement of mirror reference numerals, a front view of the primary mirror array 6 is shown in FIG. 3. In the input-side collimator lens array 4 opposing the primary mirror array 6, lenses optically coupling to the individual mirrors of primary mirror array 6 have numerals suffixed to 4 which are arranged identically to those in the primary mirror array. In the secondary mirror array 7, mirrors to which moving mirrors of the primary mirror array 6 approximately couple optically while they are not inclined have numerals suffixed to 7 which are arranged identically to those in the primary mirror array. Further, in the output-side collimator lens array 10 opposing the secondary mirror array 7, lenses optically coupling to the individual mirrors of secondary mirror array 7 have numerals suffixed to 10 which are arranged identically to those in the secondary mirror array 7.

Firstly, the input-side collimator lens 4-1 is coupled to all lenses of output side collimator lens array 10. The inclination angle of each of the moving mirror 6-1 and the moving mirror 7-1 is first changed slightly in both the X and Y axes to find a mirror angle, that is, an application voltage which makes a light beam from the input-side collimator lens 4-1 optically couple to the output-side collimator lens 10-1 at the maximum efficiency. This work is sequentially applied to the moving mirror 6-1 sequentially in association with the moving mirrors 7-1 to 7-32. Further, similar work is sequentially applied to the individual input-side collimator lenses to prepare a map of optimum application voltages as shown in Table 1 (hereinafter indicated as a lookup table).

TABLE 1

Lookup table (Example)

|  |  | OUTPUT-SIDE LENS ARRAY | | | | | |
|---|---|---|---|---|---|---|---|
|  |  | 7-1 | 7-2 | 7-3 | ... 7-30 | 7-31 | 7-32 |
| INPUT-SIDE ARRAY | 6-1 | OUTPUT<br>X = OV, Y = ΔV<br>INPUT<br>X = OV, Y = ΔV | | | | | |
|  | 6-2 | | | | | | |
|  | 6-3 | | | | | | |
|  | . | | | | | | |
|  | . | | | | | | |
|  | . | | | | | | |
|  | 6-30 | | | | | | |
|  | 6-31 | | | | | | |
|  | 6-32 | | | | | | |

If, after the lookup table is prepared through the above initial adjustment work, the relative position between the collimator lens array and the mirror array does not change and the output of the control circuit does not change, the optical coupling between the input and output optical fibers can be effected at the maximum efficiency with application voltages identical to those described in the table. However, as described above, as temperatures in the optical switch installation environment change, the relative position between the collimator lens array and the mirror array changes or as temperatures in the control circuit of optical switch system rise, the output voltage changes. As a result, the optical coupling between the input and output optical fibers cannot be effected at the maximum efficiency even when output commands conformable to the lookup table are delivered. The present invention can solve the above problems effectively at low costs.

Control construction will now be described with reference to FIG. 4. FIG. 4 is a block diagram showing a control system according to an embodiment of the invention. In FIG. 4, reference numeral 14 designates a mirror control unit for controlling the primary mirror array 6 and the secondary mirror array 7, including an amplifier, a D/A converter, an operation device and a memory. The lookup table described as above is stored in the memory of mirror control unit 14. Reference numeral 15 designates a processing unit for controlling the LD's 11 and PD's 12 to correct control of the primary mirror array 6 and secondary mirror array 7, including an A/D converter, an operation device and a memory. The mirror control unit 14 and processing unit 15 constitute an optical switch control unit 16. The optical switch control unit 16 receives a signal for switching between the input-side optical fiber and the output-side optical fiber from an external unit through an interface.

A method of controlling the optical switch will now be described with reference to FIGS. 1, 2 and 4.

To sum up, a configuration is provided in which LD's 11 not generating communication light beam are coupled to two or more input-side collimator lenses 3 and similarly, PD's 12 not receiving communication light beams are coupled to two or more output-side collimator lenses 9. By controlling the primary mirrors and secondary mirrors, the input-side collimator lenses coupled to the light emitting elements are optically coupled to the output-side collimator lenses coupled to the PD's 12. At that time, inclination angles of respective movable mirrors in the primary and secondary mirror arrays are adjusted such that the outputs of the light receiving elements are maximized. Further, optical switching is effected between two or more input-side collimator lenses and two or more output-side collimator lenses and then, inclination angles of the movable mirrors of the primary and secondary mirror arrays are adjusted such that the outputs of the PD's 12 are maximized similarly. In this manner, the inclination angle adjustments of the movable mirrors of the primary and secondary mirror arrays are carried out and from the optimum inclination angles of the primary mirrors and secondary mirrors, changes in the relative position between the collimator lens array and mirror array and changes in the output of the electrical circuit are calculated. Results of the calculation are reflected on the inclination angles of other movable mirrors for switching the communication light beams so that the inclination angle may be controlled to the optimum inclination angle taking the changes in the relative position between the collimator lens array and mirror array and the changes in the output of the electrical circuit. This will be described more specifically in the following.

Laser beams 13 from the LD's 11 are reflected by the primary measuring mirrors 110 at four corners of the primary mirror array 6 and are further reflected by the secondary measuring mirrors 120 at four corners of the secondary mirror array 7 so as to be coupled optically to PD's 12 at four corners of the output-side collimator lens array 9. While constantly measuring the optical outputs of the laser beams 13 by means of the PD's 12, inclination angles of the individual primary measuring mirrors 110 and those of the individual secondary measuring mirrors 120 are changed slightly in both the X and Y axes to find mirror attitudes which maximize the outputs of the PD's 12. In addition, switching is effected sequentially between the primary measuring mirrors 110-A to 110-D and the secondary measuring mirrors 120-A to 120-D to calculate 4×4=16 optimum mirror attitudes. Preferably, the calculation may be carried out periodically.

As shown in FIG. 4, information about the 16 optimum mirror attitudes, upon which changes in the relative position between the collimator lens array and the mirror array and changes in the output voltage of the control circuit are reflected, is reflected upon the lookup table prepared through the initial adjustment work to control the mirrors of the primary mirror array 6 and secondary mirror array 7.

An example of a method for reflection upon the lookup table will now be described. Firstly, the 16 optimum mirror attitudes determined by means of the measuring mirrors are used for replacing the relative position changes between the collimator lens array and the mirror array or the output changes of the control circuit with the relative position changes of secondary mirror array 7 as viewed from the primary mirror array 6, that is, relative deformations of the secondary mirror array 7. Subsequently, the shape of the relatively deformed secondary mirror array 7 is calculated using four measured points at four corners. Further, from results of the calculation, coordinates internal of the four corners corresponding to the lookup table are calculated approximately. The most simplified method is a linear approximation, according to which the shape of the relatively deformed secondary mirror array 7 is assumed to be a plane and the four points at four corners are connected together by straight lines to uniformly divide the inside of the plane. In an alternative, results of measurement and analysis precedently conducted are inputted in advance to provide a curved surface and the shape of the relatively deformed secondary mirror array 7 is assumed to be the curved surface and approximated in terms of the curved surface. For internal division, results of measurement and analysis precedently conduced are inputted similarly in advance to provide a curved-surface shape and a method for division most liable to occur in the curved-surface shape is employed. The thus calculated coordinates are compared with the lookup table and voltage values in the lookup tables are so controlled as to make the difference zero.

In this manner, the deflection angle of the mirror array for reflecting the communication light beams is corrected. For example, a voltage value representing a control value for obtaining a deflection angle when a light beam is optically connected from one mirror of primary mirror array 6 to the secondary mirror array 7 is corrected starting with its initial value. In case the initial value has already been changed, the existing value can be updated. If the secondary mirror array 7 is omitted and light beams going by way of the primary mirror array 6 optically connect to the output-side collimator lens array 10, a deflection angle of a mirror for optical connection from the primary mirror array 6 to one lens 9 of the output-side collimator lens array 10 can be involved.

According to the invention, since the relative position change between the primary mirror array plane and the secondary mirror array plane or the relative position change between the primary or secondary mirror array plane and the collimator lens array plane is determined and the drive amount of each mirror is corrected on the basis of the thus determined relative position change, the light emitting units and light receiving units need not be provided by the number of mirrors and therefore a compact optical switch can be formed. From this point of view, the configuration may preferably be such that measuring light beams optically connect to mirrors positioned at the outermost periphery of the mirror array.

In the embodiment as above, each of the mirror control unit and the processing unit is provided with the operation device and the memory but depending on their capacities, the operation device and the memory can be shared by these units.

While, in the foregoing embodiments, four sets (4×4=16) of mirror combinations using four LD's and four PD's are measured, the invention is not limited thereto. With one set of mirror combinations, optimum angles in X and Y axes of the mirror of the primary mirror array 6 and that of secondary mirror array 7 can be calculated. In other words, the shape of secondary mirror array 7 after the relative deformation, in which all deformations are replaced with the relative change of the secondary mirror array 7, can be calculated from at least two sets of mirror combinations. Accordingly, in the present invention, it is indispensable that two or more input-side collimator lenses optically couple to two or more output-side collimator lenses without using communication light beams and the optical coupling state is fed back.

Further, in the foregoing embodiment, the electrostatic drive system is used as the mirror driving method but the invention is not limited thereto and another drive method may be employed without impairing the effects of the invention. For example, in the case of a Lorentz force drive system, values of current flowing through coils are described in the aforementioned lookup table. On the basis of the shape of secondary mirror array 7 after the relative deformation determined through the method according to the foregoing embodiment, the lookup table described with coil current values is corrected. In other words, as far as the drive system is capable of performing control on the basis of the table prepared through the initial adjustment work, the present invention can fulfill its effects without being limited by that system.

Figure 5:
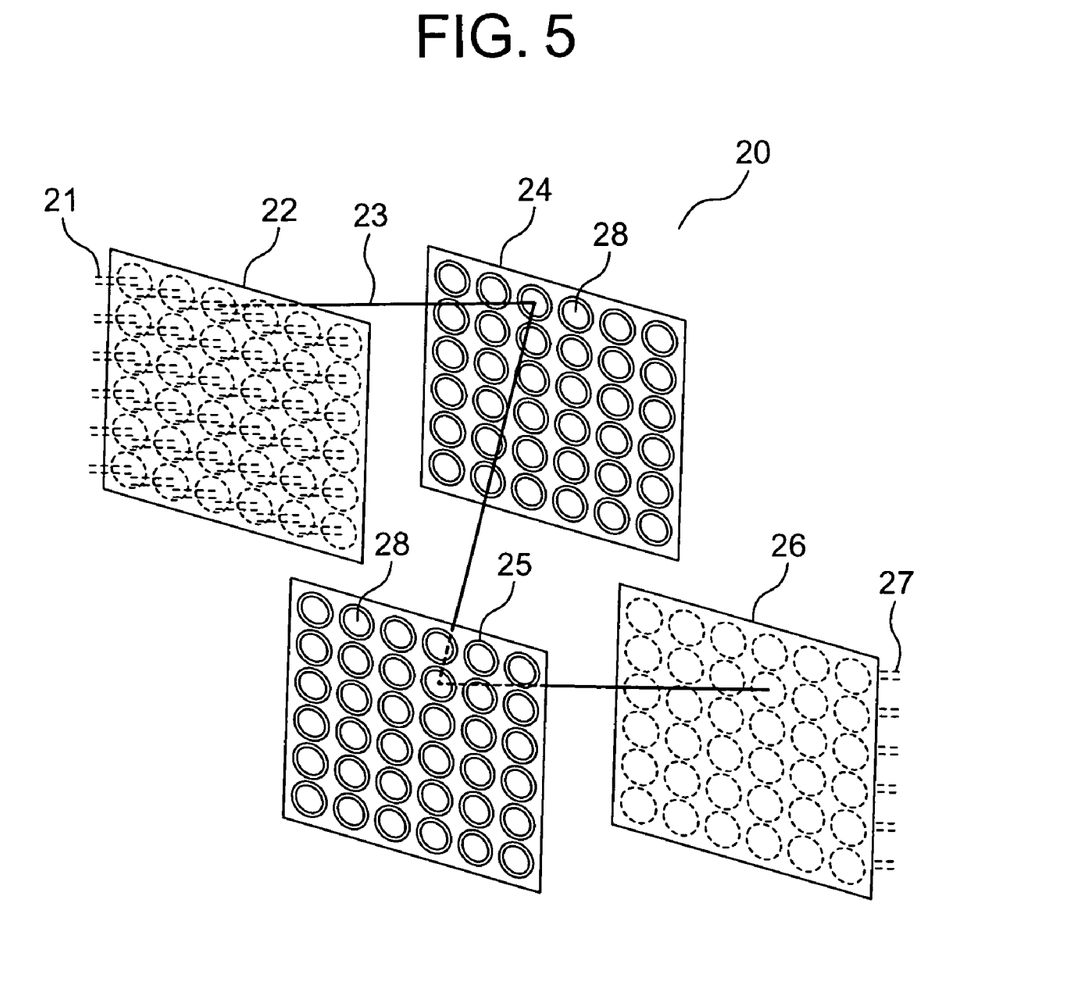
FIG. 5 is a schematic perspective view of an optical switch according to a comparative example.
Figure 6:
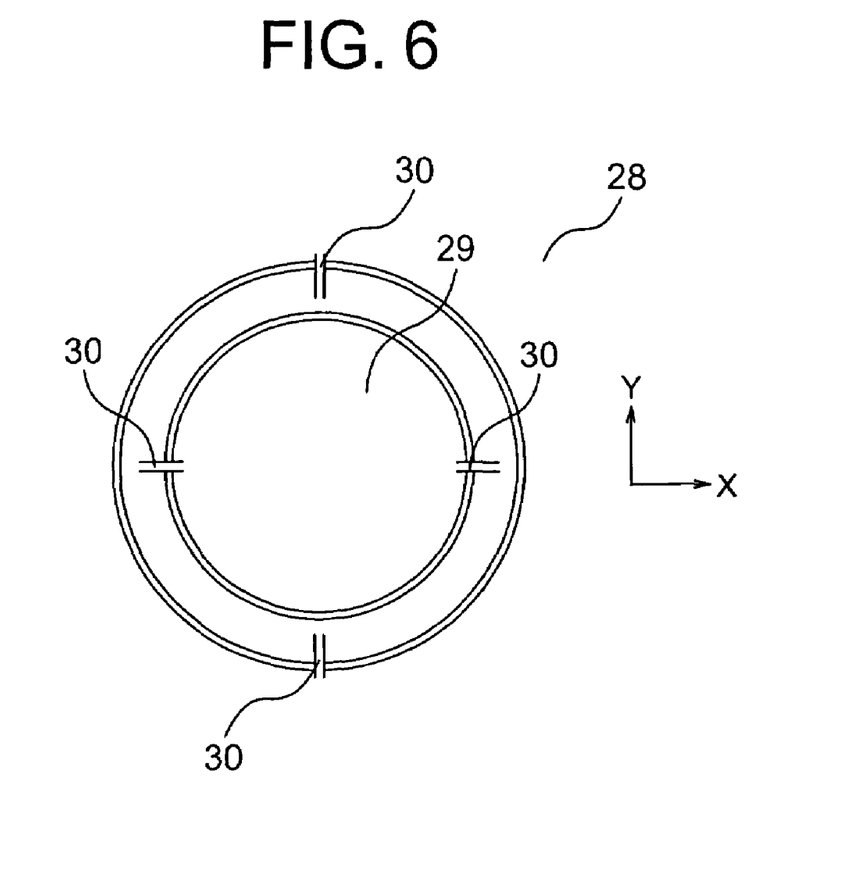
FIG. 6 is a schematic front view of a moving mirror of the optical switch in the comparative example.
Figure 7:
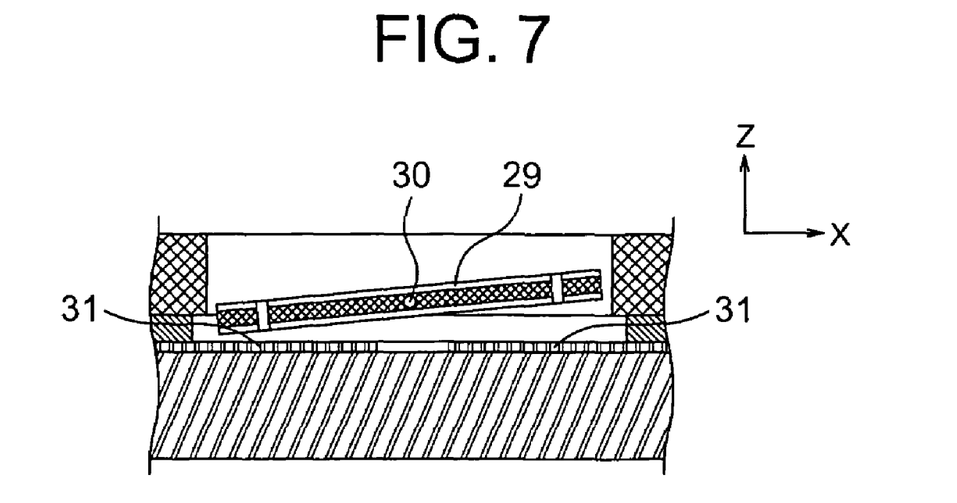
FIG. 7 is a schematic sectional view of the moving mirror of the optical switch in the comparative example.

The construction of an optical switch of a comparative example applied with MEMS technique is shown in FIGS. 5, 6 and 7. The optical switch 20 of the comparative example is comprised of optical fiber arrays, collimator lens arrays and mirror arrays. In the mirror array, one-axially or two-axially inclinational, moving mirrors are arrayed and in the optical fiber array and collimator lens array, the substantially same number of optical fibers and of collimator lenses as that of the moving mirrors are arrayed similarly. The present inventors have studied this comparative example in the course of development of the present invention but will not intend to admit it as a prior art.

A light beam 23 formed after passing through an input-side optical fiber 21 and an input-side collimator lens array 22 is reflected by a primary mirror array 24, again reflected by an opposing secondary mirror array 25 and passed through the other output-side collimator lens 26 to optically couple to an output-side optical fiber 27. Inclination attitudes of moving mirrors 28 provided in the primary mirror array 24 and secondary mirror array 25 are changed and switching is effected through reflection at the individual mirrors.

Structurally, the moving mirror 28 is swingably supported in the air by means of a plurality of beams. Various kinds of methods for inclining the moving mirror 28 are conceivable but driving based on electrostatic force (hereinafter indicated as an electrostatic drive system) and driving based on Lorentz force (hereinafter indicated as a Lorentz force drive system) are easy to electrically control. In the case of the Lorentz force drive system, coils are typically mounted on the moving mirror 28 and the moving mirror 28 is disposed in an external magnetic field in which a magnet is arranged. By controlling currents flowing through the coils, the Lorentz force is controlled, so that beams supporting the mirror portion can be twisted and s stable attitude can be maintained by balance to torsional force of the beams supporting the mirror portion. A moving mirror structure of the electrostatic drive system will be described using FIGS. 6 and 7. In the moving mirror 28, a plurality of electrodes 31 are formed at positions substantially opposing an optical reflection portion 29 swingably supported in the air by means of a plurality of beams 30 and a voltage is applied thereacross to generate electrostatic attractive force. By controlling this voltage, the electrostatic attractive force can be controlled, so that the beams 30 swingably supporting the mirror portion can be twisted and a stable attitude can be maintained under balance between twisting and torsional force of the beams.

The light beams incident on the output-side collimator lenses 26 are required of highly accurate positioning. When a light beam deviates from the edge of an output-side collimator lens 26, optical coupling fails. Even if the light beam enters the edge of the output-side collimator lens 26, the optical coupling will fail or a large loss will be incurred if the light beam has an incident angle outside a proper range. This is because a core portion (through which a communication light beam propagates) of an optical fiber connected to the edge of a collimator lens is very thin amounting to a diameter of about 10 μm and even a slightly deviant incident beam becomes out of the core portion. When the permissible loss is several dB, the incident angle of a light beam upon an output-side collimator lens 26 must have an accuracy of about a degree of several of decimal fractions, though depending on the kind of the lens and optical fiber. Accordingly, the attitudes of the individual moving mirrors 28 in mirror array which determine the position and angle of light beams must be maintained with high accuracies.

The collimator lens array and the mirror array are positioned highly accurately in the initial phase of assembling. As a result, by applying a predetermined current value in the case of the Lorentz force drive system or a predetermined voltage in the case of the electrostatic drive system, the moving mirror 28 can be maintained at a predetermined attitude and a light beam formed after being passed through a predetermined input-side collimator lens 22 can be coupled optically to a predetermined output-side collimator lens 27. However, as the temperature in the optical switch installation environment changes, the relative position between the collimator lens array and the mirror array changes, with the result that the optical coupling will possibly fail or a large loss will possibly be incurred even if the moving mirror 28 keeps the predetermined attitude. Otherwise, when temperatures in the optical switch system per se rise owing to continuous switching, the output of the electrical circuit changes, thus causing the predetermined attitude of moving mirror 28 to possibly fail to maintain.

Figure 8:
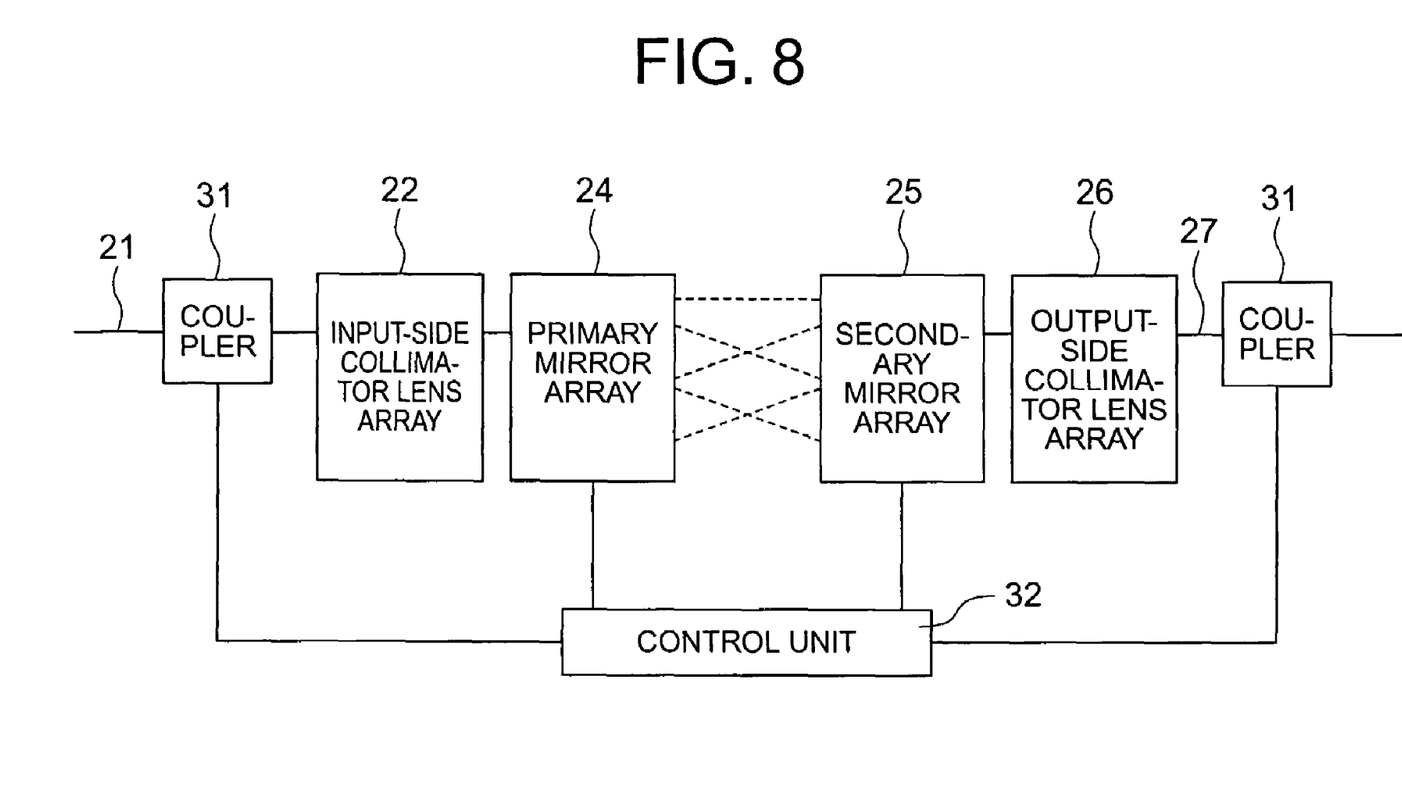
FIG. 8 is a block diagram showing the construction of an optical switch control system in the comparative example.

To avoid such phenomena as above, various control methods for controlling the attitude of moving mirror 29 highly accurately are conceivable. A method is shown in FIG. 8, according to which couplers are mounted to all input optical fibers and all output optical fibers before and after an optical switch, so that part of a communication light beam is branched and measured and fed back for the attitude control of the moving mirror 28. A coupler 31 is mounted to an input-side optical fiber 21 to branch part of a communication light beam so that the communication light beam before optical switching can be monitored. Similarly, a coupler 31 is mounted to an output-side optical fiber 27 to monitor the communication light beam after optical switching. From intensities of the communication light beams before and after the optical switching, optimum attitudes of the primary mirror array 24 and the secondary mirror array 25 are calculated by means of a control unit 32. Results of the calculation are reflected upon controlling of the primary mirror array 24 and the secondary mirror array 25. This work is carried out constantly to permit the input and output optical fibers couple to each other at the highest efficiency. For avoidance of complexity, only a single input optical fiber and only a single output optical fiber are illustrated in FIG. 8. As mentioned above, the couplers must be mounted to all of the input optical fibers and all of the output optical fibers in this method. In the method in which the couplers are mounted to all input/output optical fibers, indicating that in the case of N×N optical switches, that is, N input ports, 2N couplers are needed. The cost incurred for this is a cause of raising the cost of the optical switch as a whole. In addition, because of branching through the couplers, losses in the input/output light beams increase. In the event that the communication light beams decreases in intensity, the communication light beams must once be converted electrically, subjected to electrical amplification and again converted into light beams. The intervention of this amplification process, opto-electric conversion equipments and electro-optic conversion equipments are needed and these conversion apparatus lead to high costs.

Contrary to this, in the construction of the present embodiment, the demerits of the above comparative example can be lessened and the positional changes of the collimator lens array and mirror array and the output changes of the electrical circuit can be corrected without branching the communication light beams by using the couplers. Consequently, the number of parts of the optical switch can be decreased. In addition, the loss caused by branching through the coupler can be suppressed.

Further, in the optical switch according to the present embodiment of the invention, the communication light beam is not branched using the coupler and therefore, the optical switch can be compacted as compared to the conventional one.

Further, because of the elimination of the coupler, inexpensiveness can be assured in the optical switch control method of the invention.

Furthermore, since the positional changes of the collimator lens array and the mirror array and the output changes of the electric circuit are measured by means of mirrors different from and independent of mirrors for switching the communication light beams, the mirrors for switching the communication light beams need not be moved slightly. As a result, coupling of the communication light beams can be stable.

As a modified example of the foregoing embodiment, the secondary mirror array 7 may be replaced with a reflection plate and it should be understood that the present invention can be applied effectively to such a case.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An optical switch for switching communication light beams input from first external units through input-side optical fibers and propagating to second external units through output-side optical fibers, said optical switch comprising an input-side lens array, a primary mirror array, a secondary mirror array, an output-side lens array, two or more light emitting elements which do not emit communication light beams and two or more light receiving elements, said input-side lens array including a first plurality of input-side lenses adapted to couple to said input-side optical fibers and a second plurality of input-side lenses on which light beams are incident from said two or more light emitting elements, said primary mirror array including a first plurality of moving mirrors on which light beams passing through said first plurality of input-side lenses are incident, said secondary mirror array including a second plurality of moving mirrors on which light beams passing through said first plurality of input-side lenses are incident, said primary mirror array further including primary measuring mirrors on which light beams passing through said second plurality of input-side lenses are incident, said secondary mirror array further including secondary measuring mirrors on which light beams passing through said primary measuring mirrors are incident, said output-side lens array including a second plurality of output-side lenses on which light beams passing through said second plurality of moving mirrors are incident and adapted to couple to said output-side optical fibers, and a second plurality of output-side lenses on which light beams passing through said secondary measuring mirrors are incident and adapted to couple to said two or more light receiving elements, and said optical switch further comprising a mirror control unit for correcting control values for controlling angles at which said first plurality of moving mirrors and said second plurality of moving mirrors are moved, based on signals from said two or more light receiving elements which receive light beams passing through said second plurality of output-side lenses.

2. The optical switch according to claim 1, wherein said mirror control unit determines a change of a relative position between said input-side lens array and said primary mirror away, a change of a relative position between said primary mirror array and said secondary mirror array, or a change of a relative position between said secondary mirror array and said output-side lens array, based on the signals from said two or more light receiving elements, and corrects the control values of angles at which said first plurality of moving mirrors and said second plurality of moving mirrors are moved, on the basis of the determined relative position change.

3. The optical switch according to claim 1, wherein said primary measuring mirrors are disposed at four corners of said primary mirror array, and said secondary measuring mirrors are disposed at four corners of said secondary mirror array.

4. An optical switch for switching communication light beams between ones of input-side optical fibers and output-side optical fibers, said optical switch comprising an input-side lens array, a primary mirror array, a secondary mirror array, an output-side lens array, measuring light emitting/receiving pairs for outputting/receiving measuring light beams between a input side and output side of said optical switch, said input-side lens array including a plurality of input-side lenses of a same type, wherein a major sub-plurality of said input-side lenses are adapted to communicate said communication light beams with said input-side optical fibers, and a minor sub-plurality of said input-side lenses are adapted to communicate said measuring light beams with said measuring light emitting/receiving pairs, said primary mirror array including a plurality of primary moving mirrors of a same type, wherein a major sub-plurality of said primary moving mirrors are adapted to communicate said communication light beams with said major sub-plurality of said input-side lenses, and a minor sub-plurality of said primary moving mirrors are adapted to communicate said measuring light beams with said minor sub-plurality of said input-side lenses, said secondary mirror array including a plurality of secondary moving mirrors of a same type, wherein a major sub-plurality of said secondary moving mirrors are adapted to communicate said communication light beams with said major sub-plurality of said primary moving mirrors, and a minor sub-plurality of said secondary moving mirrors are adapted to communicate said measuring light beams with said minor sub-plurality of said primary moving mirrors, said output-side lens array including a plurality of output-side lenses of a same type, wherein a major sub-plurality of said output-side lenses are adapted to communicate said communication light beams with said major sub-plurality of said secondary moving mirrors and with said output-side optical fibers, and a minor sub-plurality of said output-side lenses are adapted to communicate said measuring light beams with said minor sub-plurality of said secondary moving mirrors and with said measuring light emitting/receiving pairs, said optical switch further comprising a mirror control unit for correcting control values for controlling angles at which said plurality of primary moving mirrors and said plurality of secondary moving mirrors are moved, based on measuring light beam signals from said measuring light emitting/receiving pairs.

5. The optical switch according to claim 4, wherein said mirror control unit determines a change of a relative position between said input-side lens array and said primary mirror array, a change of a relative position between said primary mirror array and said secondary mirror array, or a change of a relative position between said secondary mirror array and said output-side lens array, based on said measuring light beam signals from said measuring light emitting/receiving pairs, and corrects control values of angles at which said plurality of primary moving mirrors and said plurality of secondary moving mirrors are moved, on a basis of the determined relative position change.

6. The optical switch according to claim 4, wherein ones of said minor sub-plurality of said primary moving mirrors are disposed at four corners of said primary mirror array, and ones of said minor sub-plurality of said secondary moving mirrors are disposed at four corners of said secondary mirror array.

7. An optical switch for switching communication light beams between ones of first-side optical fibers and second-side optical fibers, said optical switch comprising a first-side lens array, a first-side mirror array, a second-side mirror array, an second-side lens array, measuring light emitting/receiving pairs for outputting/receiving measuring light beams between a first side and second side of said optical switch, said first-side lens array including a plurality of first-side lenses of a same type, wherein a major sub-plurality of said first-side lenses are adapted to communicate said communication light beams with said first-side optical fibers, and a minor sub-plurality of said first-side lenses are adapted to communicate said measuring light beams with said measuring light emitting/receiving pairs, said first-side mirror array including a plurality of first-side moving mirrors of a same type, wherein a major sub-plurality of said first-side moving mirrors are adapted to communicate said communication light beams with said major sub-plurality of said first-side lenses, and a minor sub-plurality of said first-side moving mirrors are adapted to communicate said measuring light beams with said minor sub-plurality of said first-side lenses, said second-side mirror array including a plurality of second-side moving mirrors of a same type, wherein a major sub-plurality of said second-side moving mirrors are adapted to communicate said communication light beams with said major sub-plurality of said first-side moving mirrors, and a minor sub-plurality of said second-side moving mirrors are adapted to communicate said measuring light beams with said minor sub-plurality of said first-side moving mirrors, said second-side lens array including a plurality of second-side lenses of a same type, wherein a major sub-plurality of said second-side lenses are adapted to communicate said communication light beams with said major sub-plurality of said second-side moving mirrors and with said second-side optical fibers, and a minor sub-plurality of said second-side lenses are adapted to communicate said measuring light beams with said minor sub-plurality of said second-side moving mirrors and with said measuring light emitting/receiving pairs, said optical switch further comprising a mirror control unit for correcting control values for controlling angles at which said plurality of first-side moving mirrors and said plurality of second-side moving mirrors are moved, based on measuring light beam signals from said measuring light emitting/receiving pairs.

8. The optical switch according to claim 7, wherein said mirror control unit determines a change of a relative position between said first-side lens array and said first-side mirror array, a change of a relative position between said first-side mirror array and said second-side mirror array, or a change of a relative position between said second-side mirror array and said second-side lens array, based on said measuring light beam signals from said measuring light emitting/receiving pairs, and corrects control values of angles at which said plurality of first-side moving mirrors and said plurality of second-side moving mirrors are moved, on the basis of the determined relative position change.

9. The optical switch according to claim 7, wherein ones of said minor sub-plurality of said first-side moving mirrors are disposed at four corners of said first-side mirror array, and ones of said minor sub-plurality of said second-side moving mirrors are disposed at four corners of said second-side mirror array.

* * * * *